Dec. 7, 1926.

T. C. ESPOSITO

BURNER

Filed Dec. 2, 1925

1,609,511

Inventor
Thomas C. Esposito, deceased;
by Rose Marie Esposito
Administratrix
By B. Singer
Attorney Patented Dec. 7, 1926.

1,609,511

UNITED STATES PATENT OFFICE.

THOMAS C. ESPOSITO, DECEASED, LATE OF BROOKLYN, NEW YORK; BY ROSE MARIE ESPOSITO, ADMINISTRATRIX, OF BROOKLYN, NEW YORK, ASSIGNOR TO JOSEPH R. ESPOSITO, OF GREAT NECK, LONG ISLAND, NEW YORK.

BURNER.

Application filed December 2, 1925. Serial No. 72,778.

The invention relates to improvements in oil burners, more particularly to that type of burner which is to be used in conjunction with a fire pot of a furnace, and the object of this invention is to produce a simple and efficient device, which is inexpensive to manufacture, durable in operation, and which may be readily assembled and dismantled.

The invention is an improvement on the burner for which Letters Patent of the United States No. 1,512,460 were granted to the said Thomas C. Esposito October 21, 1924, one specific object of the present improvement being to dispense with the generator described in said Letters Patent and to provide an improved form of generator which is arranged within the combustion chamber, which increases the efficiency of the burner and enables economies to be effected in the construction thereof.

Another object is to provide means for equally distributing the fuel over the surface of the generator.

A futher object is to prevent clogging of the fuel supply pipe.

Still another object is to properly and uniformly heat the lower circumferential portion of the generator when starting the burner and prior to supplying the fuel, ignition of which takes place along the lower circumference of the generator.

With the above and other objects in view, the invention consists in the construction, combination and arrangement of devices hereinafter described and claimed.

In the accompanying drawings—

Figure 1:
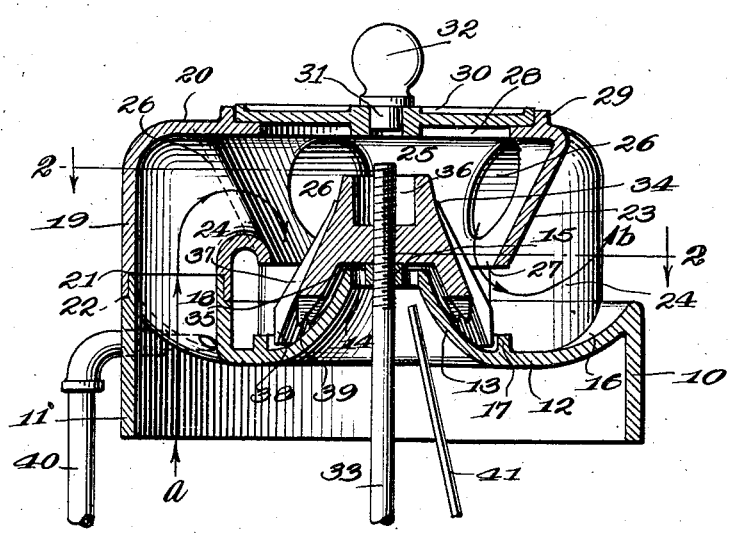
Figure 1 is a vertical central sectional view of a burner constructed and arranged in accordance with this invention.
Figure 2:
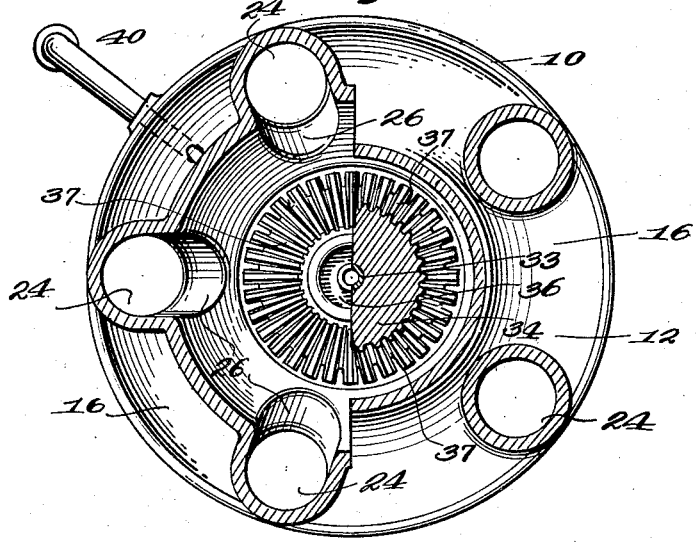
Figure 2 is a horizontal sectional view of the same on the planes indicated by the line 2—2 of Figure 1.

The burner includes a base member 10 which consists of a circular wall 11 and a cover portion 12 which is preferably integral therewith and which has a central substantially frusto-conical portion 13 which is provided at its upper part with openings 14 and also with a central threaded opening 15. The said cover 12 forms a chamber 16 in its upper side and is provided with an upstanding concentric flange 17 and also with a suitable number of appropriately spaced tubular members 18 which are open at the upper and lower ends.

An annular member 19, which is open at the lower side and which is closed at the upper side as at 20 is provided with a plurality of tubular members 24. Each member has at the lower edge of its wall a shoulder 21 which fits on a corresponding shoulder 22 with which the upper edge of the wall of each tubular member 18 is provided. Said annular member also has an inverted frusto-conical wall 23 which depends from its top 20 and which is above and concentric with the frusto-conical extension 13 of the base 10. Said tubular members 18 and 24 open into the chamber 25 which is formed within the inverted frusto-conical wall 23, through openings 26, as will be understood. The diameter of the lower end of the wall 23 is considerably greater than that of the upper end of the frusto-conical extension 13 so that an annular open space 27 is formed therebetween, as shown.

The top 20 of the annular member 19 is provided with a central opening 28 and also with a circular upstanding flange 29 which extends around and is spaced from said opening. A cover 30 is provided which bears on the top of the member 19 and within the flange 29 and is provided with a plug 31, said cover having a central opening to receive said plug and said plug having an enlarged knob or handle 32 at its upper end to facilitate its removal from said opening.

A fuel supply pipe 33 extends upwardly through and is threadedly engaged in the opening 15 of the base, the upper end of said fuel supply pipe projecting above the frusto-conical extension 13 of the cover of the base.

There is also an improved generator which serves to crack the fuel oil and to convert the same into vapor to unite with air within the chamber 25 and thus form a highly inflammable gas. Said generator is indicated at 34 and is of frusto-conical form provided with a correspondingly shaped recess 35 in its under side and provided in its upper end with a cup 36. The upper end of the fuel supply pipe 33 extends through and is threaded to said generator, the extreme upper end of said pipe being arranged and extending up through the center of the cup 36.

The said member 34 is provided on its exterior with downwardly extending grooves 37 which at the lower end of said member terminate in open spaces between which lie tooth like downwardly extending projections 38. Inside of said tooth like projections and opposite each second space is another depending tooth like projection 39. These grooves and projections serve to evenly distribute the fuel oil which flows downwardly from the pipe 33 and cup 36 over the exterior of the member 34 as will be understood.

An overflow pipe 40 leads from the basin or chamber 16 of the base member 10. A gas pipe 41, for use in starting the burner is arranged with its upper end below the top of the frusto-conical extension 13 of the base as shown.

The operation of this improved burner is as follows: In order to start the burner in operation, gas from the pipe 41 is ignited, the flame passes through the space formed between said member 34 and said frusto-conical extension 13, and through the spaces formed between the projections 38, especially through every other space, as the path through alternate spaces is blocked by the inner projections 39. When the member 34 is sufficiently heated, the fuel oil is then caused to be supplied by the pipe 33 to the said generator member 34, such oil first filling the cup 36 and overflowing therefrom on to and passing down over the exterior surface of said member 34. Owing to the heated condition of such member, the oil as it passes downwardly over the same is cracked and converted into vapor, being distributed and its cracking and vaporizing facilitated by the grooves 37 and projections 38, 39 as before described. Air enters the chamber 25 of the burner, within the member 19, through the ducts or tubes 18, 24 and becomes commingled with the vapor, thereby forming a highly inflammable gas which passes downward through the annular space between the lower edge of the wall 23 and the member 34 and ignites near the highly heated lower circumference of the generator, the flames passing radially outwardly therefrom, as shown in the drawings. The air intake is represented by the arrows $a$ and the direction of the passage of the vapor and of the flame is indicated by the arrows $b$. No means is employed for regulating the supply of air to the burner as this is effected automatically.

The cover member described in the before mentioned Letters Patent may be employed or may be dispensed with as desired. The burner is here shown as without such cover. By removing the member 30 access may be had to the interior of the burner to facilitate assembling and dissembling thereof. In practice the burner requires very little attention and rarely requires to be cleaned, as the residues from the oil are nearly entirely consumed, and as practically no carbon is formed when starting the device, owing to the fact that the fuel is uniformly distributed over the surface of the generator and that the generator is uniformly preheated and has a highly heated lower circumferential portion along which ignition takes place. The zone of ignition is therefore also far removed from the point of supply and the supply overflow pipe is of liberal dimensions, so that clogging of the supply pipe by carbon is eliminated. This was one of the objectionable features of the older construction, which furthermore necessitated frequent cleaning of the supply pipe in view of accumulation of heavy volatile fractions of the fuel oil. In the event that any of the oil escapes combustion in the burner, the same will pass out from the base member through the pipe 40. When it becomes necessary to clean the upper end of the fuel supply pipe 33, the plug 31 may be readily removed to enable a suitable instrument to be readily inserted into the upper end of said pipe.

While there is herein shown and described a preferred embodiment of the invention, it should be understood that changes may be made in the form, proportion and construction of the several parts, within the scope of the appended claims.

Having thus described the invention, what is claimed is:

1. A burner of the class described comprising a base, a member on the base provided with a combustion chamber which opens downwardly toward the base, said base and said member having air intake openings leading to said chamber, a generating element arranged in said chamber and means to supply fuel oil to the exterior of said generating element, said generating element being of substantially conical form and provided with grooves in its exterior surface, and also provided with downwardly extending projections to which said grooves lead.

2. A burner comprising a base having a substantially conical projection in its center, a casing member on the base provided with a combustion chamber which opens downwardly toward the base, said base and said member having air intake openings leading to said chamber, a fuel supply pipe extending upwardly through said substantially conical projection of the base and into said chamber and a substantially conical generating element on the upper end of said supply pipe and arranged in said chamber and in spaced relation to said substantially conical extension of said base.

3. A burner comprising a base having a substantially conical projection in its center, a casing member on the base provided with a combustion chamber which opens downwardly toward the base, said base and said member having air intake openings leading to said chamber, a fuel supply pipe extending upwardly through said substantially conical projection of the base and into said chamber and a substantially conical generating element on the upper end of said supply pipe and arranged in said chamber and in spaced relation to said substantially conical extension of said base, said generating element having a cup in its upper portion around the upper end of said pipe.

4. A burner comprising a base having a substantially conical projection in its center, a casing member on the base provided with a combustion chamber which opens downwardly toward the base, said base and said member having air intake openings leading to said chamber, a fuel supply pipe extending upwardly through said substantially conical projection of the base and into said chamber and a substantially conical generating element on the upper end of said supply pipe and arranged in said chamber and in spaced relation to said substantially conical extension of said base, said base member having openings under the base of said generating element and means to produce a gas flame for heating said generating element through said openings.

5. A burner of the class described comprising a base having an upper covering or top wall forming a basin and provided with a substantially conical extension, a casing member on said base having a combustion chamber opening downwardly toward said basin, said base and casing member being also provided with air intake openings leading to said combustion chamber, an overflow pipe leading from said basin, a fuel supply pipe extending upwardly through said conical extension of the base and into said combustion chamber and a substantially conical generating element on and in spaced relation to said substantially conical extension of the base and supplied with fuel by said fuel supply pipe.

6. A burner of the class described comprising a base having an upper covering or top wall forming a basin and provided with a substantially conical extension, a casing member on said base having a combustion chamber opening downwardly toward said basin, said base and casing member being also provided with air intake openings leading to said combustion chamber, an overflow pipe leading from said basin, a fuel supply pipe extending upwardly through said conical extension of the base and into said combustion chamber and a substantially conical generating element on and in spaced relation to said substantially conical extension of the base and supplied with fuel by said fuel supply pipe, the said covering or top wall having an upstanding flange in the bottom of said basin and said generating element having downwardly extending projections at its lower end arranged within said upstanding flange.

In witness whereof I affix my signature.

ROSE MARIE ESPOSITO.
*Administratix of Thomas C. Esposito, Deceased.*